(12) United States Patent
Johnston et al.

(10) Patent No.: US 9,697,206 B2
(45) Date of Patent: *Jul. 4, 2017

(54) SYSTEM AND METHOD FOR ENHANCING VOICE-ENABLED SEARCH BASED ON AUTOMATED DEMOGRAPHIC IDENTIFICATION

(71) Applicant: Interactions LLC, Franklin, MA (US)

(72) Inventors: Michael J. Johnston, New York, NY (US); Srinivas Bangalore, Morristown, NJ (US); Junlan Feng, Basking Ridge, NJ (US); Taniya Mishra, New York, NY (US)

(73) Assignee: Interactions LLC, Franklin, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/877,709

(22) Filed: Oct. 7, 2015

(65) Prior Publication Data
US 2016/0026627 A1 Jan. 28, 2016

Related U.S. Application Data

(63) Continuation of application No. 13/847,173, filed on Mar. 19, 2013, now Pat. No. 9,189,483, which is a
(Continued)

(51) Int. Cl.
*G10L 15/00* (2013.01)
*G06F 17/30* (2006.01)
*G10L 15/22* (2006.01)

(52) U.S. Cl.
CPC .. *G06F 17/30026* (2013.01); *G06F 17/30976* (2013.01); *G06F 17/30979* (2013.01); *G10L 15/22* (2013.01); *G10L 2015/227* (2013.01)

(58) Field of Classification Search
CPC ......... G10L 15/00; G10L 15/07; G10L 15/18; G10L 15/1807; G10L 15/20; G10L 15/22; G10L 17/00; G10L 17/22; G10L 17/26
(Continued)

(56) References Cited

U.S. PATENT DOCUMENTS 6,816,858 B1 11/2004 Coden et al.
6,877,001 B2 4/2005 Wolf et al.
(Continued)

OTHER PUBLICATIONS

Pon-Barry et al., "Identifying uncertain words within an utterance via prosodic features," In Proceedings of the 10.sup.th Annual Conference of the International Speech Communication Association (Interspeech 2009), Brighton, UK, Sep. 6-10, 2009, pp. 1-4.
(Continued)

*Primary Examiner* — Qi Han
(74) *Attorney, Agent, or Firm* — Fenwick & West LLP (57) ABSTRACT

Disclosed herein are systems, methods, and non-transitory computer-readable storage media for approximating responses to a user speech query in voice-enabled search based on metadata that include demographic features of the speaker. A system practicing the method recognizes received speech from a speaker to generate recognized speech, identifies metadata about the speaker from the received speech, and feeds the recognized speech and the metadata to a question-answering engine. Identifying the metadata about the speaker is based on voice characteristics of the received speech. The demographic features can include age, gender, socio-economic group, nationality, and/or region. The metadata identified about the speaker from the received speech can be combined with or override self-reported speaker demographic information.

17 Claims, 4 Drawing Sheets

Related U.S. Application Data continuation of application No. 12/888,012, filed on Sep. 22, 2010, now Pat. No. 8,401,853.

(58) Field of Classification Search
USPC .............. 704/246, 251, 231, 235, 243, 270
See application file for complete search history.

(56) References Cited

U.S. PATENT DOCUMENTS

| | | | |
|---|---|---|---|
| 7,177,795 B1 * | 2/2007 | Chen | G10L 15/1815 704/1 |
| 7,181,398 B2 | 2/2007 | Thong et al. | |
| 7,209,880 B1 | 4/2007 | Gajic et al. | |
| 7,280,968 B2 | 10/2007 | Blass | |
| 7,373,300 B1 | 5/2008 | Bangalore et al. | |
| 8,060,412 B2 * | 11/2011 | Rosenbaum | G06Q 30/02 704/244 |
| 8,214,210 B1 | 7/2012 | Woods | |
| 2002/0010584 A1 | 1/2002 | Schultz et al. | |
| 2003/0204399 A1 | 10/2003 | Wolf et al. | |
| 2003/0204492 A1 | 10/2003 | Wolf et al. | |
| 2005/0273318 A1 | 12/2005 | Zhou et al. | |
| 2006/0265224 A1 * | 11/2006 | Bennett | 704/246 |
| 2007/0038436 A1 | 2/2007 | Cristo et al. | |
| 2008/0103780 A1 | 5/2008 | Dacosta | |
| 2008/0172359 A1 | 7/2008 | Lundell et al. | |
| 2009/0037174 A1 | 2/2009 | Seltzer et al. | |
| 2009/0138356 A1 | 5/2009 | Pomplun | |
| 2010/0036660 A1 | 2/2010 | Bennett | |
| 2010/0154015 A1 | 6/2010 | Kang et al. | |
| 2011/0196678 A1 | 8/2011 | Hanazawa | |
| 2012/0022866 A1 | 1/2012 | Ballinger et al. | |
| 2012/0072217 A1 | 3/2012 | Bangalore et al. | |

OTHER PUBLICATIONS

Chen et al., "Improved spoken document retrieval by exploring extra acoustic and linguistic cues," Proceedings of the 7.sup.th European Conference on Speech Communication and Technology, vol. 1, 2001, pp. 1-4.

Johnson, Michael T., "Incorporating prosodic information and language structure into speech recognition systems," Diss. Purdue University, Aug. 2000, pp. 1-205.

U.S. Appl. No. 12/884,959, filed Sep. 17, 2010, Bangalore et al.

United States Office Action, U.S. Appl. No. 13/847,173, Mar. 20, 2015, 11 pages.

* cited by examiner

FIG. 2

(Prior Art)

SYSTEM AND METHOD FOR ENHANCING VOICE-ENABLED SEARCH BASED ON AUTOMATED DEMOGRAPHIC IDENTIFICATION

PRIORITY INFORMATION

The present application is a continuation of U.S. patent application Ser. No. 13/847,173, filed Mar. 19, 2013, which is in turn a continuation of U.S. patent application Ser. No. 12/888,012, filed Sep. 22, 2010, the content of both of which is included herein in its entirety.

BACKGROUND

1. Technical Field

The present disclosure relates to search in a database and more specifically to voice-enabled search based on metadata.

2. Introduction

One of the most important aspects of voice-enabled search is its ability to accurately receive and recognize speech and generate an appropriate response. What constitutes an appropriate response is a difficult question to answer and appropriate responses may vary according the individual needs of different users making a search query. An appropriate response to one user may not be as useful to another even when their search queries are exactly identical. Thus, it is often beneficial to have as much information about the user who is making a search query in order to provide him or her with the most relevant response. One approach to solving this problem is to ask additional questions to gather more information such as age, gender, location, etc. However, asking more questions is a costly effort both in terms of time and money. The users may also be annoyed by a barrage of questions that pertain to personal information out of privacy concerns.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for generating responses to users in voice-enabled searches using metadata. A voice-enabled search system recognizes speech uttered by a user such as a query. The metadata are extracted from the user's speech and can contain information about the user's demographic identification such as age, gender, nationality, region, socio-economic group. Such data in turn increase the likelihood of approximating more relevant responses to user speech queries. The recognized speech and the metadata are fed into a question-answering engine and the question-answering engine returns one or more responses back to the user.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for approximating a response to a speech query in voice-enabled search. A system, method and non-transitory computer-readable media are disclosed which approximate one or more relevant responses to a speech query based on metadata analysis. A discussion of a basic general purpose system or computing device in FIG. 1 which can be employed to practice the concepts is disclosed herein. Then the disclosure discusses at a high level the natural language dialog system shown in FIG. 2. A more detailed description of the method and various embodiments will then follow. The disclosure now turns to FIG. 1.

Figure 1:
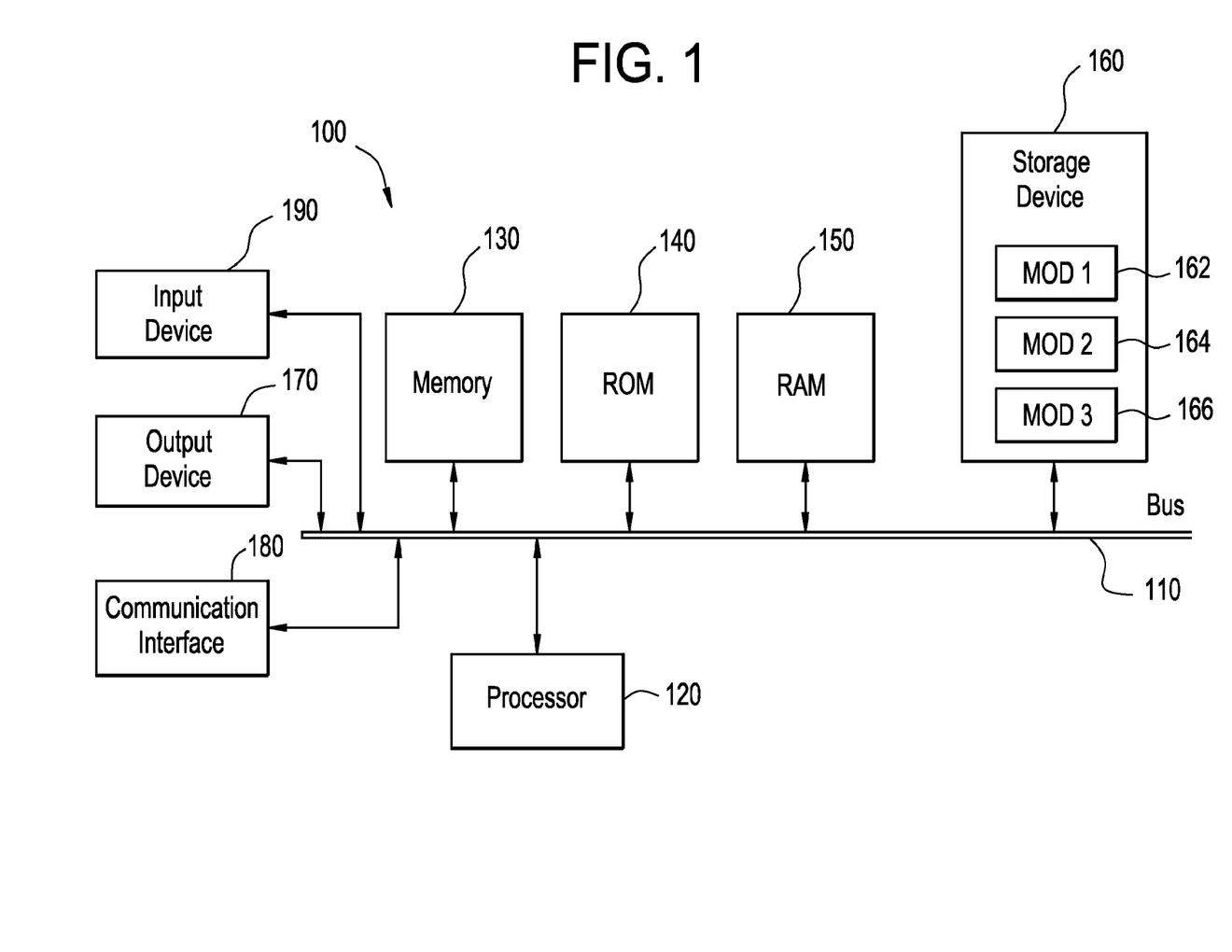
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache 122 provides a performance boost that avoids processor 120 delays while waiting for data. These and other modules can be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, earner signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
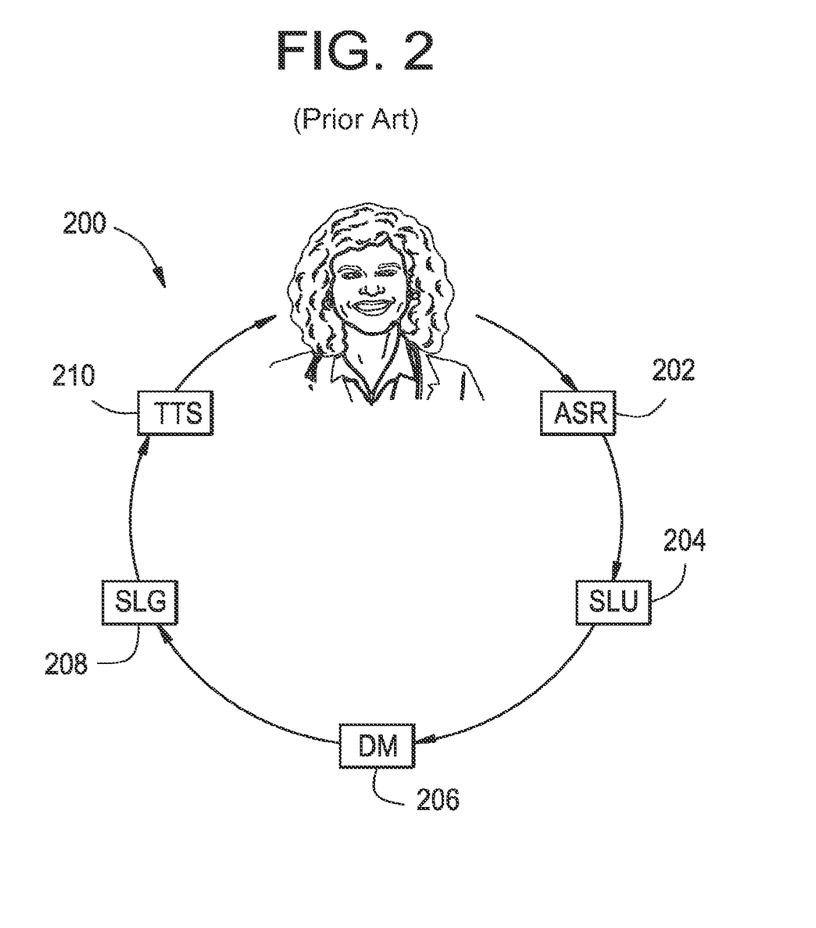
FIG. 2 is a functional block diagram that illustrates an exemplary natural language spoken dialog system.

Having disclosed some basic computing device components, the discussion now turns to the exemplary spoken dialog system. FIG. 2 is a functional block diagram that illustrates an exemplary natural language spoken dialog system. Spoken dialog systems aim to identify intents of humans, expressed in natural language, and take actions accordingly, to satisfy their requests. Natural language spoken dialog system 200 can include an automatic speech recognition (ASR) module 202, a spoken language understanding (SLU) module 204, a dialog management (DM) module 206, a spoken language generation (SLG) module 208, and a text-to-speech (TTS) module 210. The TTS module 210 can be replaced by a more generic synthesizing (SM) module which can synthesize speech in other ways than text-to-speech. The synthesizing module can be any type of speech output module. For example, it can be a module wherein one prerecorded speech segment is selected and played to a user. Thus, the synthesizing module represents any type of speech output. The present disclosure focuses on innovations related to the ASR module 202 and can also relate to other components of the dialog system.

The ASR module 202 analyzes speech input and provides a textual transcription of the speech input as output. SLU module 204 can receive the transcribed input and can use a natural language understanding model to analyze the group of words that are included in the transcribed input to derive a meaning from the input. The role of the DM module 206 is to interact in a natural way and help the user to achieve the task that the system is designed to support. The DM module 206 receives the meaning of the speech input from the SLU module 204 and determines an action, such as, for example, providing a response, based on the input. The SLG module 208 generates a transcription of one or more words in response to the action provided by the DM 206. The synthesizing module 210 receives the transcription as input and provides generated audible speech as output based on the transcribed speech. Speech can be produced text-to-speech, unit selection, or other known mechanism for producing speech.

Thus, the modules of system 200 recognize speech input, such as speech utterances, transcribe the speech input, identify (or understand) the meaning of the transcribed speech, determine an appropriate response to the speech input, generate text of the appropriate response and from that text, generate audible "speech" from system 200, which the user then hears. In this manner, the user can carry on a natural language dialog with system 200. Those of ordinary skill in the art will understand the programming languages for generating and training ASR module 202 or any of the other modules in the spoken dialog system. Further, the modules of system 200 can operate independent of a full dialog system. For example, a computing device such as a smartphone (or any processing device having a phone capability) can include an ASR module wherein a user says "call mom" and the smartphone acts on the instruction without a "spoken dialog."

Figure 3:
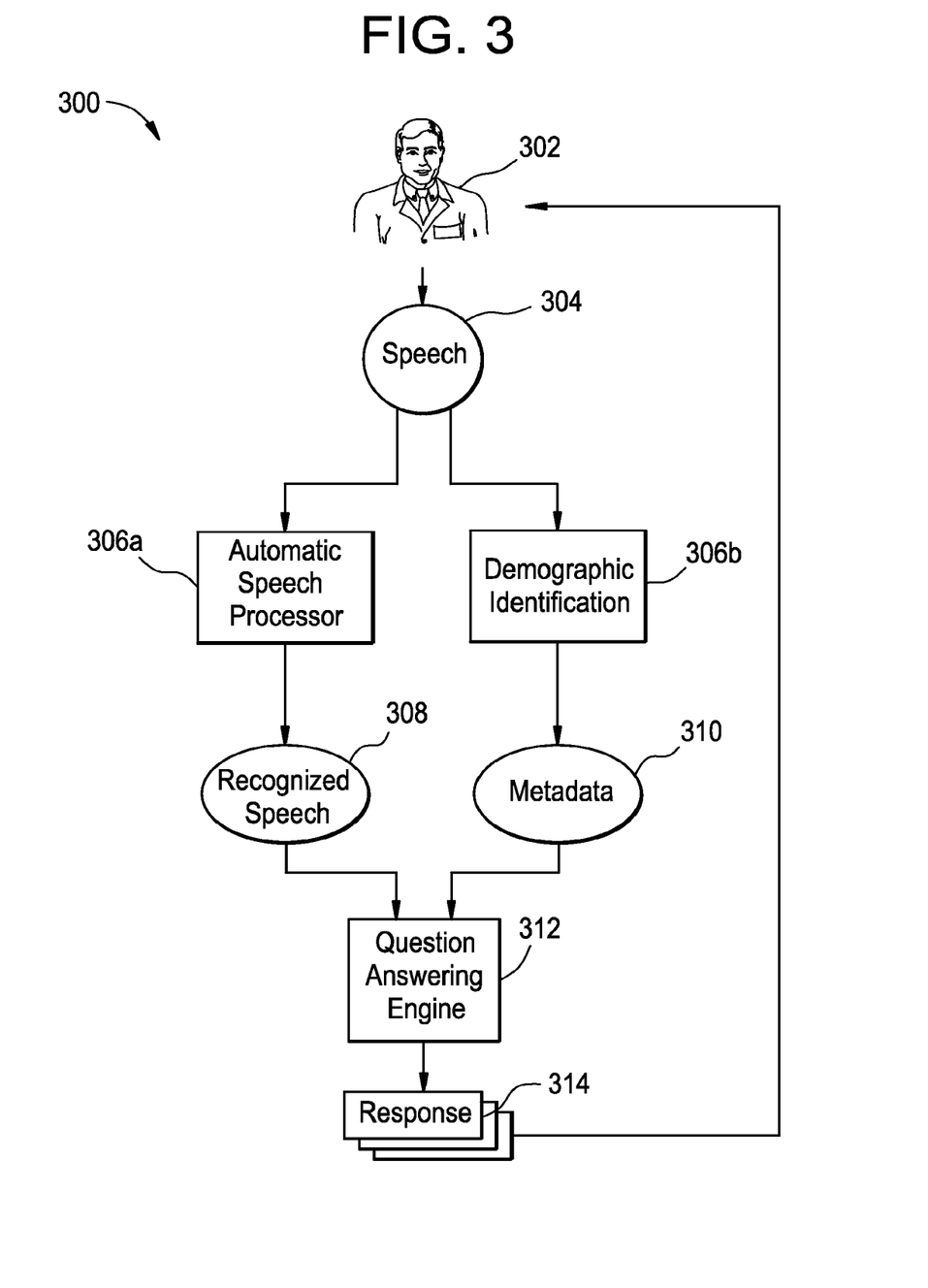
FIG. 3 illustrates an exemplary voice-enabled search system with supporting infrastructure for extracting and incorporating metadata.

Having disclosed some basic system components and ASR components, the disclosure now turns to the exemplary voice-enabled search system 300 shown in FIG. 3. In this embodiment, a user 302 utters a user speech 304, which is then received by an automatic speech processor 306A and a demographic identification module 306B. The user 302 can utter the speech 304 to a local device such as a kiosk or to a remote device over a telecommunication network such as via a cellular phone, landline phone, Internet-enabled voice chat, and so forth. The speech processor 306A and demographic identification module 306B can also receive the user speech 304 in the form of pre-recorded audio data.

The automatic speech processor 306A recognizes the speech 304 input and outputs a recognized speech 308. The demographic identification module 306B extracts metadata 310 associated with demographic traits extrapolated from or estimated from the speech 304. For example, a young woman's voice has very different characteristics than an older male's voice. The system infers the metadata from these different characteristics and other speech patterns such as accent, vocabulary, and so forth. In one embodiment, the metadata 310 describes user's demographic features such as age, gender, nationality, region, socio-economic group, and so forth. The demographic identification module 306B obtains clues by analyzing the characteristics of the received speech. For example, the pitch and timbre of the speaker's voice can provide information as to what age group the speaker belongs to and what gender the speaker is. In another example, recognizing a certain speaking style, an accent, a local dialect, vocabulary or other phraseology can help approximating the speaker's nationality, region, socio-economic group, etc. The metadata 310 can include a confidence score, not shown, describing how certain the system is of the inferred metadata.

The metadata can include demographic features such as at least one of age, gender, socio-economic group, nationality, and region. The step of identifying the metadata about the speaker can be based on voice characteristics of the received speech. Further, recognizing the received speech and identifying the metadata can occur in parallel. Metadata identified about the speaker from the received speech can supplement, integrate an/or override self-reported speaker demographic information.

The metadata 310 thus obtained and, in one variation, the associated confidence scores can be fed into the question-answering engine 312 in addition to the recognized speech 308 to produce one or more responses 314. In one aspect, the question-answering engine 312 can be integrated into the same hardware system where the automatic speech processor 306A and demographic identification module 306B reside. In another aspect, the question-answering engine 312 can be a separate system from the speech processor 306A and/or the demographic identification module 306B.

In generating a response 314 to the user speech 304, the question-answering engine 312 can refer to both the recognized speech 308 and the metadata 310 to arrive at a response that is most relevant to the user's needs. For example, depending on which age group the user belongs to, the user's query, "What kind of gift should I get for my boyfriend?" can yield varying responses: a video game for a teenager or golf clubs for an older user, for instance. In another example, if a user inquiring about the TV station that airs a World Cup soccer game is found to have a Latin American accent, the question-answering engine can recommend a Spanish language channel as an alternative choice.

The question-answering engine 312 can compare the query to a database of other users with similar metadata characteristics to determine a best response. For example, if a strong correlation exists in the database between the people who talk very fast and the tendency to prefer corn-dogs, the next time a fast-talking user makes a query about food recommendation the system can recommend a corn-dog.

Extracting demographic information from the metadata is beneficial because it allows approximating more appropriate and relevant responses without having to ask any further questions. Asking too many questions can make the speaker feel uncomfortable or annoyed not to mention the extra time involved.

In one embodiment, one or more of the responses 314 can be relayed back to the user 302. The user can receive the responses in an audio form via voice, in a visual form via text or combination of both.

In one embodiment, system-wide privacy policies can be put in place to control collection of sensitive data. In another embodiment, these policies can allow collection of personal data but restrict storing any of the information on a permanent basis. In yet another embodiment, storing some of the sensitive data on non-transitory storage medium can be allowed but they are scheduled to be deleted after a set period of time according to predetermined privacy policy. The sensitive data can be encrypted and/or anonymized so as to further protect the identity of the users. For example, a privacy policy can dictate whether to gather data on any one or more of age, gender, nationality, region, socio-economic, and so forth. Even if gathered, these data can be designated as "no storage" or "to be purged" to protect the privacy of the users. In still another embodiment, the privacy policies can be influenced by user preference. In other words, users can be given a choice of whether to opt in or opt out of some of the features that can potentially infringe upon user privacy.

Figure 4:
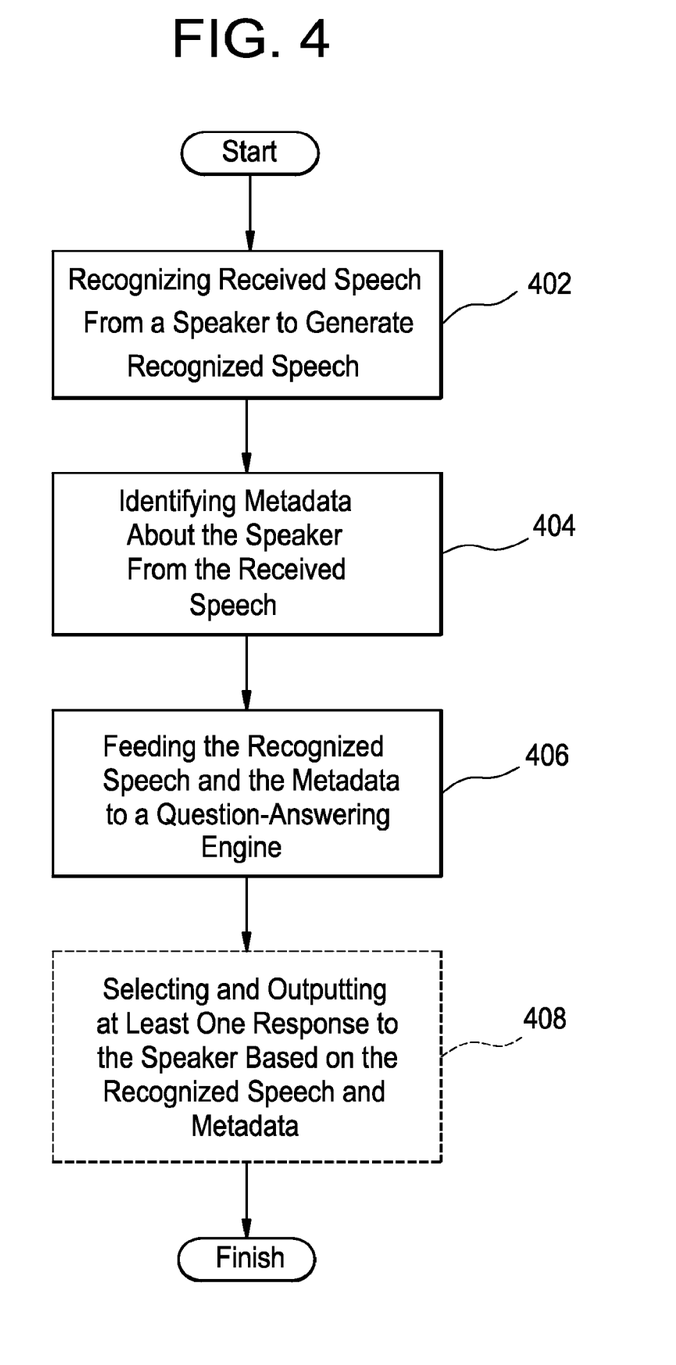
FIG. 4 illustrates an example method embodiment.

This disclosure now turns to the exemplary method embodiment shown in FIG. 4 for voice-enabled search using demographic identification. For the sake of clarity, the method is discussed in terms of an exemplary system 100 such as is shown in FIG. 1 configured to practice the method. The system 100 recognizes received speech from a speaker to generate recognized speech (402).

The system 100 identifies metadata about the speaker from the received speech (404). These metadata can be generated based on the characteristics of the speaker's voice and style of speech.

The system 100 feeds the recognized speech and the metadata to a question-answering engine (406). The metadata can be the demographic information about the speaker. For instance, the metadata can identify that the speaker is a white female in her 50s or that the speaker is an African American male in his 20s. In one respect, inferred metadata can be blended with, complement, or invalidate other metadata the system already has.

The system 100 selects and outputs at least one response to the speaker based on the recognized speech and metadata. The metadata helps approximate more relevant responses than the ones that are generated without the aid of such additional information. Specifically, the metadata related to the demographic identification of the speaker can help generate responses that are more tailored and specific to the speaker's projected needs by comparing responses to others who have similar voice characteristics and/or projected demographics.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

What is claimed is:

1. A method performed by a speech recognition system, the method comprising:
    receiving recognized speech;
    identifying information about a speaker of the recognized speech from the recognized speech;
    generating confidence scores indicating degrees of certainty of the identified information; and
    submitting the recognized speech, the information, and the confidence scores to a question-answering engine integrated with the speech recognition system, which outputs a response associated with the recognized speech using the recognized speech, the information, and the confidence scores.

2. The method of claim 1, wherein the information comprises demographic features.

3. The method of claim 2, wherein the demographic features comprise one of age, gender, socio-economic group, nationality, and origin.

4. The method of claim 1, wherein identifying of the information is based on voice characteristics of the recognized speech.

5. The method of claim 1, further comprising storing the information for future use.

6. The method of claim 5, wherein the storing of the information is performed in accordance with a privacy policy.

7. The method of claim 1, wherein the response comprises audible speech.

8. A speech recognition system comprising:
    a processor; and
    a computer-readable storage medium having instruction stored which, when executed by the processor, result in the processor performing operations comprising:
    receiving recognized speech;
    identifying information about a speaker of the recognized speech from the recognized speech;
    generating confidence scores indicating degrees of certainty of the identified information; and
    submitting the recognized speech, the information, and the confidence scores to a question-answering engine integrated with the speech recognition system, which outputs a response associated with the recognized speech using the recognized speech, the information, and the confidence scores.

9. The system of claim 8, wherein the information comprises demographic features.

10. The system of claim 9, wherein the demographic features comprise one of age, gender, socio-economic group, nationality, and origin.

11. The system of claim 8, wherein identifying of the information is based on voice characteristics of the recognized speech.

12. The system of claim 8, the computer-readable storage medium having additional instructions which result in the operations further comprising storing the information for future use.

13. The system of claim 12, wherein the storing of the information is performed in accordance with a privacy policy.

14. A non-transitory computer-readable storage medium having instruction stored which, when executed by a computing device, result in the computing device performing operations comprising:

receiving recognized speech at a speech recognition system;

identifying information about a speaker of the recognized speech from the recognized speech;

generating confidence scores indicating degrees of certainty of the identified information; and submitting the recognized speech, the information, and the confidence scores to a question-answering engine integrated with the speech recognition system, which outputs a response associated with the recognized speech using the recognized speech, the information, and the confidence scores.

15. The non-transitory computer-readable storage medium of claim 14, wherein the information comprises demographic features.

16. The non-transitory computer-readable storage medium of claim 15, wherein the demographic features comprise one of age, gender, socio-economic group, nationality, and origin.

17. The non-transitory computer-readable storage medium of claim 14, wherein identifying of the information is based on voice characteristics of the recognized speech.

* * * * *